United States Patent
Bono

(10) Patent No.: US 9,659,383 B2
(45) Date of Patent: May 23, 2017

(54) IMAGE COMPRESSION DEVICE, IMAGE COMPRESSION METHOD, AND IMAGE COMPRESSION PROGRAM

(71) Applicant: DeNA Co., Ltd., Tokyo (JP)

(72) Inventor: Hironori Bono, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 15/043,400

(22) Filed: Feb. 12, 2016

(65) Prior Publication Data
US 2016/0253823 A1    Sep. 1, 2016

(30) Foreign Application Priority Data

Feb. 26, 2015    (JP) .................................. 2015-036723

(51) Int. Cl.
*G06K 9/36* (2006.01)
*G06T 9/00* (2006.01)

(52) U.S. Cl.
CPC ........................................ *G06T 9/00* (2013.01)

(58) Field of Classification Search
CPC .......... G06T 9/00; G06K 9/36; H04N 19/146; H04N 19/15
See application file for complete search history.

(56) References Cited

U.S. PATENT DOCUMENTS

| | | | | |
|---|---|---|---|---|
| 5,832,126 | A * | 11/1998 | Tanaka ..................... | H04N 1/41 382/176 |
| 6,606,415 | B1 * | 8/2003 | Rao ........................... | G06T 9/00 382/228 |
| 2002/0102027 | A1 * | 8/2002 | Miyake .................. | H04N 19/15 382/239 |
| 2010/0060629 | A1 * | 3/2010 | Rasmusson ........... | G06T 15/005 345/419 |
| 2016/0267683 | A1 * | 9/2016 | Nakanishi ................ | G06T 9/00 |

* cited by examiner

*Primary Examiner* — Li Liu
(74) *Attorney, Agent, or Firm* — Procopio, Cory, Hargreaves & Savitch LLP

(57) ABSTRACT

A reference image is generated by converting a vector image into a raster image, a temporarily-compressed image is generated by compressing the raster image according to a compression ratio, a comparison image of the same size as the reference image is generated by subjecting the temporarily-compressed image to interpolation enlargement processing, the above processing is repeated while varying the compression ratio if the error ratio between the reference image and the comparison image is greater than a benchmark error ratio, the above processing is repeated while varying the benchmark error ratio if the image volume of the temporarily-compressed image is greater than a predetermined memory capacity when the error ratio is at or under the benchmark error ratio, and the temporarily-compressed image is stored in memory as a compressed image of a vector image if the image volume of the temporarily-compressed image is at or under the memory capacity.

5 Claims, 2 Drawing Sheets

IMAGE COMPRESSION DEVICE, IMAGE COMPRESSION METHOD, AND IMAGE COMPRESSION PROGRAM

The present application claims the benefit of Japanese Patent Application No. JP2015-036723, filed on Feb. 26, 2015, the content of which is incorporated herein in its entirety by reference.

BACKGROUND

1. Field

The present invention relates to an image compression device, an image compression method, and an image compression program (e.g., non-transitory computer readable medium having machine-executable instructions with which a computer having a storage and a hardware processor).

2. Related Art

Information processing is performed using various kinds of images in the software of electronic games and so forth. Image data can be divided into raster image data that is expressed by a grouping of scanning lines such as in bitmap graphics and so forth, and vector image data that is expressed by the coordinates (positions) of the start and end points of a line segment, the direction of the line, the distance, how it curves, its thickness, its color, the colors of surfaces bounded by the line segment, changes in these attributes, and so forth.

An advantage to vector graphics is that image quality is maintained when the image is enlarged or reduced, but a problem is that drawing takes a long time. In view of this, when an image is displayed on an information terminal, a drawn vector image is stored in memory as a raster image, such as a bitmap, and when the same image is displayed, the raster image is read from the memory and displayed, which makes the processing more efficient.

SUMMARY OF THE INVENTION

Problems to be Solved by the Invention

Processing to compress a raster image is performed to reduce the data volume in electronic games and the like. However, with a device with a small memory capacity, such as a mobile device, there are limitations on how much memory can be used, so there is a pronounced drop in processing speed during execution if the raster image cannot be compressed to fit this memory capacity.

In view of this, it is an object of the present invention to provide an image compression device, an image compression method, and an image compression program (e.g., non-transitory computer readable medium having machine-executable instructions with which a computer having a storage and a hardware processor) with which, when a vector image is made into a raster image and compressed, the discrepancy from an original image can be minimized, while the raster image can be compressed to fit the usable memory capacity.

SUMMARY

A mode of the present invention is an image compression device, comprising: a reference image generation means for generating a reference image by converting a vector image into a raster image; a temporarily-compressed image generation means for generating a temporarily-compressed image by compressing the raster image according to a compression ratio; a comparison image generation means for generating a comparison image of the same size as the reference image by subjecting the temporarily-compressed image to enlargement processing; an error evaluation means for repeating the processing of the temporarily-compressed image generation means and the comparison image generation means while varying the compression ratio if the error ratio between the reference image and the comparison image is greater than a benchmark error ratio; and a volume evaluation means for repeating the processing of the temporarily-compressed image generation means, the comparison image generation means, and the error evaluation means while varying the benchmark error ratio if the image volume of the temporarily-compressed image is greater than a predetermined memory capacity when the error ratio in the error evaluation means is at or under the benchmark error ratio, and storing the temporarily-compressed image in memory as a compressed image of the vector image if the image volume of the temporarily-compressed image is at or under the memory capacity.

Here, it is preferable that processing is performed on a plurality of vector images, the volume evaluation means repeats the processing of the reference image generation means, the comparison image generation means, and the error evaluation means while varying the benchmark error ratio if the image volume of the temporarily-compressed images for the plurality of vector images is greater than the memory capacity, and stores the temporarily-compressed images for the plurality of vector images in memory as compressed images if the image volume of the temporarily-compressed images is at or under the memory capacity.

It is also preferable to vary the benchmark error ratio according to one or more of the characteristics, type, and display mode of the vector image.

Another mode of the present invention preferably comprises a first step of generating a reference image by converting a vector image into a raster image, a second step of generating a temporarily-compressed image by compressing the raster image according to a compression ratio, a third step of generating a comparison image of the same size as the reference image by subjecting the temporarily-compressed image to enlargement processing, a fourth step of repeating the second and third steps while varying the compression ratio if the error ratio between the reference image and the comparison image is greater than a benchmark error ratio, and a fifth step of repeating the second to fourth steps while varying the benchmark error ratio if the image volume of the temporarily-compressed image is greater than a predetermined memory capacity when the error ratio in the fourth step is at or under the benchmark error ratio, and storing the temporarily-compressed image in memory as a compressed image of the vector image if the image volume of the temporarily-compressed image is at or under the memory capacity.

Another mode of the present invention is an image compression program (e.g., non-transitory computer readable medium having machine-executable instructions with which a computer having a storage and a hardware processor) that causes a computer to function as: a reference image generation means for generating a reference image by converting a vector image into a raster image; a temporarily-compressed image generation means for generating a temporarily-compressed image by compressing the raster image according to a compression ratio; a comparison image generation means for generating a comparison image of the same size as the reference image by subjecting the temporarily-compressed image to interpolation processing; an error evaluation means for repeating the processing of the temporarily-compressed image generation means and the comparison image generation means while varying the compression ratio if the error ratio between the reference image and the comparison image is greater than a benchmark error ratio; and a volume evaluation means for repeating the processing of the temporarily-compressed image generation means, the comparison image generation means, and the error evaluation means while varying the benchmark error ratio if the image volume of the temporarily-compressed image is greater than a predetermined memory capacity when the error ratio in the error evaluation means is at or under the benchmark error ratio, and storing the temporarily-compressed image in memory as a compressed image of the vector image if the image volume of the temporarily-compressed image is at or under the memory capacity.

Effects of the Invention

With the present invention, when a vector image is made into a raster image and compressed, the discrepancy from the original image can be minimized, while the raster image can be compressed to fit the usable memory capacity.

DETAILED DESCRIPTION

Basic Configuration

Figure 1:
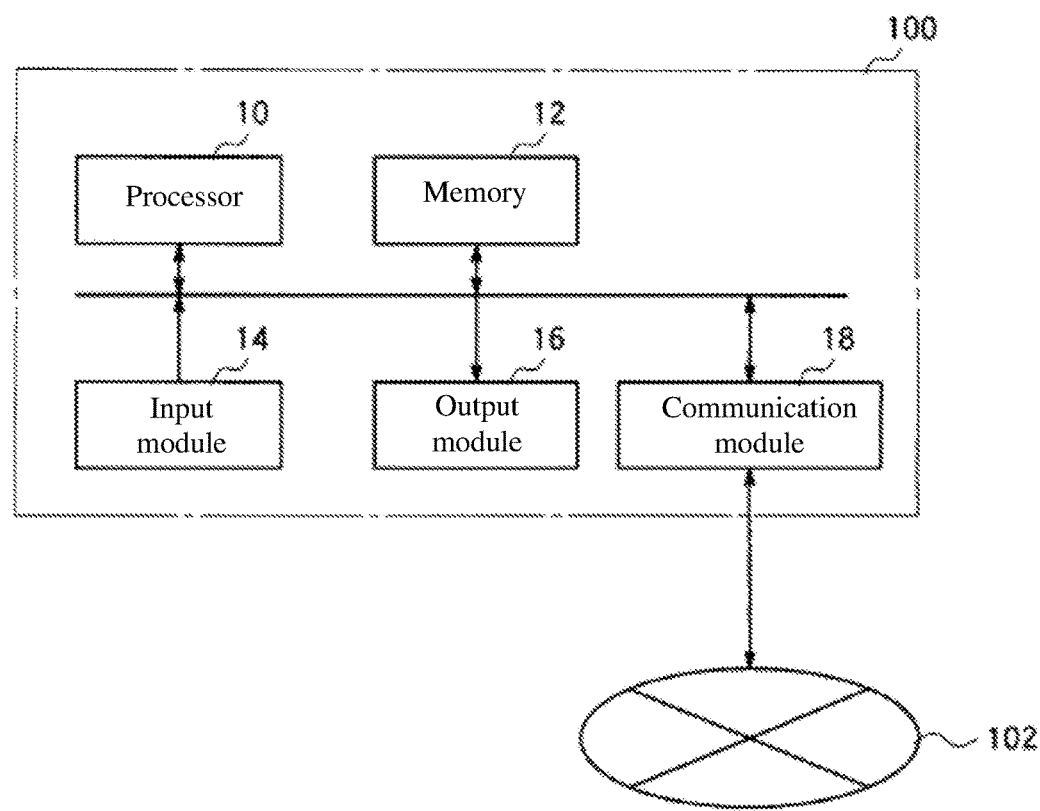
FIG. 1 A diagram of the configuration of the image compression device in an embodiment of the present invention.
Figure 2:
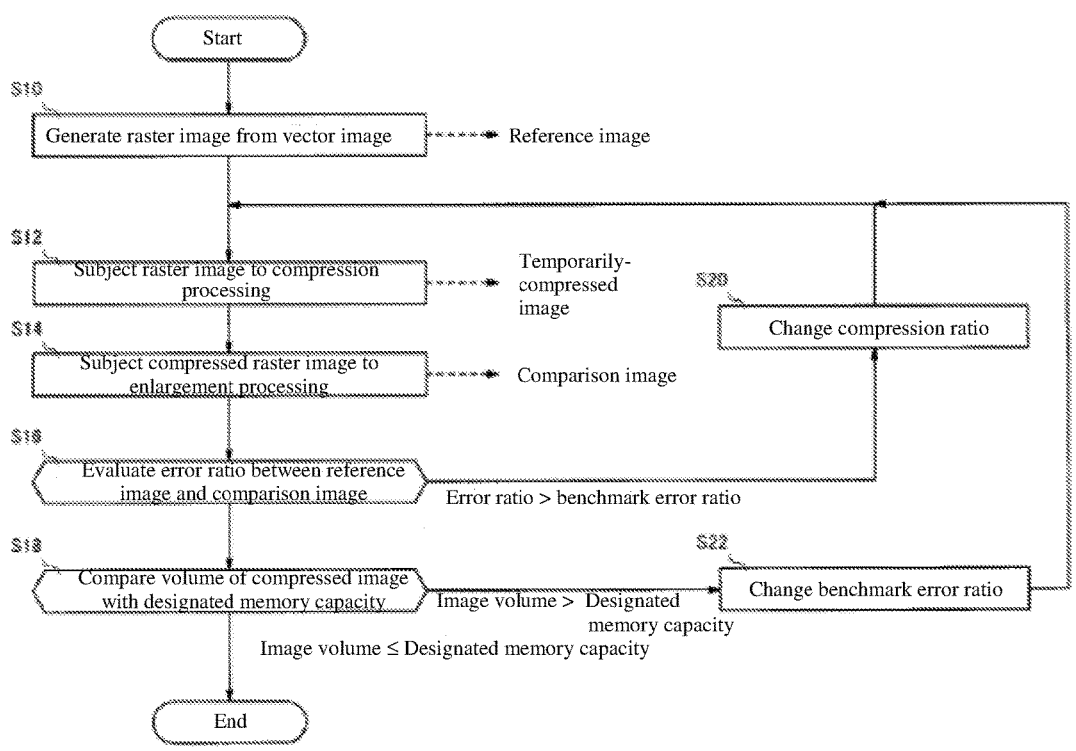
FIG. 2 A flowchart of the image compression method in an embodiment of the present invention.

As shown in FIG. 1, the image compression device 100 in an embodiment of the present invention includes a processor 10, a memory 12, an input module 14, an output module 16, and a communication module 18. The image compression device 100 has the basic configuration of an information processing device that is able to communicate with a computer, a portable telephone, a smart phone, a tablet terminal, or the like.

The processor 10 includes a means for performing computation processing, such as a CPU. The processor 10 executes an image compression program (e.g., non-transitory computer readable medium having machine-executable instructions with which a computer having a storage and a hardware processor) stored in the memory 12, and thereby performs compression processing so that a vector image used in the processing of electronic games or the like is converted into a raster image to fit in a specific memory capacity. However, processing that makes use of compressed images is not limited to electronic games, and may be any application that uses a raster image obtained by conversion of a vector image. The memory 12 includes a storage means, such as a semiconductor memory or a memory card. The memory 12 is accessibly connected to the processor 10, and stores image compression programs (e.g., non-transitory computer readable media having machine-executable instructions with which a computer having a storage and a hardware processor), data required for processing, and other such information. The input module 14 includes a means for inputting information to the image compression device 100. The input module 14 comprises, for example, a keyboard, a touch panel, buttons, or the like for receiving input from the user. The output module 16 includes a means for outputting a user interface screen (UI) or the like for receiving input information from the user, as well as processing results from the image compression device 100. The output module 16 comprises a display that shows images to the user, for example. The communication module 18 includes an interface for exchanging information with other information communication devices via an information communication network 102. Communication with the communication module 18 may be wired or wireless.

The raster image that has undergone compression processing in the image compression device 100 can be sent to and used by another information processing device (computer, portable telephone, smart phone, tablet terminal, etc.) via the communication module 18.

<Image Compression Processing>

In this embodiment, the function of converting a vector image into a compressed raster image is accomplished by executing an image compression program (e.g., non-transitory computer readable medium having machine-executable instructions with which a computer having a storage and a hardware processor) in the image compression device 100. In this embodiment, we will describe image compression processing in which a plurality of vector images used in an electronic game or the like are respectively converted into a plurality of compressed raster images so as to fit a specific designated memory capacity.

A designated memory capacity is the memory capacity permitted to be used as image cache memory or the like in applications that make use of the vector images to be processed. The designated memory capacity is preset according to the type of application and the type of device in which the application will be executed (computer, portable telephone, smart phone, tablet terminal, etc.), for example.

In step S10, processing is performed to convert vector images into raster images. The processing in this step causes the image compression device 100 to function as a reference image generation means (e.g., generator). The processor 10 reads image data written in vector format (vector image) that has been stored in the memory 12, draws according to the vector image draw command that has been read, and generates image data in raster format (raster image). If there are two or more vector images to be processed, each vector image is read and converted into a raster image. The processor 10 stores the raster image generated in this step as a reference image in the memory 12.

In step S12, processing is performed to compress the generated raster image. The processing in this step causes the image compression device 100 to function as a temporarily-compressed image generation means (e.g., generator). Compression processing is performed according to a compression ratio. The processor 10 reads the raster image generated in step S10, and subjects the raster image to compression processing according to the currently set compression ratio. If there are two or more raster images to be processed, each raster image is read and subjected to compression processing. The processor 10 stores the raster image that has undergone compression processing in this step as a temporarily-compressed image in the memory 12.

An existing algorithm can be used as needed for the compression processing. For example, a method can be employed in which the pixels of the original raster image are thinned out and compression is performed according to a compression ratio, or in which compression is performed using an average pixel value among a plurality of pixels of the original raster image.

The initial value of the compression ratio is set as a predetermined value, and is changed to a suitable compression ratio at which the raster image can be compressed so as to fit the designated memory capacity in the following processing.

Also, the compression ratio may also be corrected for each image according to the characteristics, type, display mode, etc., of the vector image being processed.

Examples of the characteristics of a vector image include the size of the image, the number of expressed colors of the image, the brightness range of the image, and the number of edges of the image. For instance, when a vector image of large size is compressed, it will be easier to recognize a discrepancy between the compressed raster image and the original vector image than when a vector image of small size is compressed at the same compression ratio. In view of this, weighted correction may be performed so that the larger is the size of the vector image being processed, the lower is the compression ratio. Also, when a vector image with a large number of expressed colors is compressed, for example, it will be easier to recognize a discrepancy between the compressed raster image and the original vector image than when a vector image with fewer expressed colors is compressed at the same compression ratio. In view of this, weighted correction may be performed so that the more expressed colors there are in the vector image being processed, the lower is the compression ratio. Also, when a vector image with a wide brightness range is compressed, for example, it will be easier to recognize a discrepancy between the compressed raster image and the original vector image than when a vector image with a narrow brightness range is compressed at the same compression ratio. In view of this, weighted correction may be performed so that the wider the brightness range is in the vector image being processed, the lower is the compression ratio. Also, when a vector image with a large number of edges is compressed, for example, it will be easier to recognize a discrepancy between the compressed raster image and the original vector image than when a vector image with few edges is compressed at the same compression ratio. In view of this, weighted correction may be performed so that the more edges there are in the vector image being processed, the lower is the compression ratio. Also, when text is included in the image, for example, it will be easier to recognize a discrepancy between the compressed raster image and the original vector image than when no text is included. In view of this, weighted correction may be performed so that the compression ratio will be lower when text is included in the vector image being processed than when no text is included.

Examples of the type of vector image include types determined by an application that makes use of background images, character images, and other such images. For example, usually a background image is larger in size and continues to be displayed for a longer time, whereas a character image is smaller in size and changes in a shorter time, so a discrepancy between the compressed raster image and the original vector image will be easier to recognize when a background image is compressed than when a character image is compressed at the same compression ratio. In view of this, weighted correction may be performed so that a vector image that is a background image has a lower compression ratio than a vector image that is a character image.

Examples of display modes of a vector image include modes of display of an image in the application that makes use of the image, such as an image displayed in a static state, an image displayed in a moving state, an image displayed spanning a plurality of scenes, and an image displayed without spanning a plurality of scenes. For instance, when an image displayed in a static state is compressed, it will be easier to recognize a discrepancy between the compressed raster image and the original vector image than when an image displayed in a moving state is compressed at the same compression ratio. In view of this, weighted correction may be performed so that an image displayed in a static state will have a lower compression ratio than an image displayed in a moving state. Also, when an image displayed spanning a plurality of scenes is compressed, for example, it will be easier to recognize a discrepancy between the compressed raster image and the original vector image than when an image displayed without spanning a plurality of scenes is compressed at the same compression ratio. In view of this, weighted correction may be performed so that an image displayed spanning a plurality of scenes will have a lower compression ratio than an image displayed not spanning a plurality of scenes.

In step S14, enlargement processing is performed to enlarge the temporarily-compressed image and convert it to an image of the same size as the reference image. The processing in this step causes the image compression device 100 to function as a comparison image generation means (e.g., generator). Enlargement processing is performed according to an enlargement ratio that is the inverse of the compression ratio. The processor 10 reads from the memory 12 the temporarily-compressed image generated in step S12, and subjects the temporarily-compressed image thus read to enlargement processing according to the currently set enlargement ratio. If there are more than one temporarily-compressed images to be processed, each temporarily-compressed image is read and subjected to enlargement processing. The processor 10 stores the raster image that has undergone enlargement processing in this step in the memory 12 as a comparison image.

An existing algorithm may be employed as needed for this enlargement processing. For example, nearest neighbor interpolation, in which enlargement is performed by inserting pixels whose value is interpolated from neighboring pixels in between said neighboring pixels, bilinear interpolation, in which enlargement is performed by linearly interpolating the pixel values of pixels at four surrounding locations, and inserting in between said surrounding pixels, bicubic interpolation, in which the pixel values of 16 surrounding pixels are interpolated cubically and inserted between said surrounding pixels, and so forth can be used.

In step S16, the error ratio between the reference image and the comparison image is evaluated. The processing in this step causes the image compression device 100 to function as an error evaluation means (e.g., evaluator). The processor 10 finds the error ratio between the reference image generated in step S10 and the comparison image corresponding to said reference image generated in step S14, shifts the processing in step S18 if this error ratio is at or under a benchmark error ratio, and reduces the compression ratio in step S20 to less than the current value and returns the processing to step S12 if this error ratio is greater than the benchmark error ratio.

The error ratio here is preferably a value obtained by dividing a value obtained by adding up the difference of the pixel values for the pixels corresponding to the comparison image and the reference image generated from the same vector image for all of the pixels by the total pixel count Na.

For example, it is preferable to find the difference in brightness for pixels corresponding to a comparison image and a reference image generated from the same vector image, add up the differences in brightness value for all of the pixels, divide this sum by the total pixel count Na, and use this quotient as the error ratio.

In the case of a color image, it is preferable to find the sum of the mean square error for the color values of the pixels i (Rci, Gci, Bci, αci) corresponding to the comparison image and the color values of the pixels i (Rri, Gri, Bri, αri) of the reference image generated from the same vector image, divide this sum by the total pixel count Na, and use this quotient as the error ratio a. Specifically, the error ratio a is expressed by Mathematical Formula 1. R stands for red, G for green, B for blue, and α for transparency (alpha blend).

Mathematical Formula 1

$$a = \left\{ \sum_{i=1}^{Na} \sqrt{\begin{array}{c}(Rci-Rri)^2 + (Gci-Gri)^2 + \\ (Bci-Bri)^2 + (\alpha ci - \alpha ri)^2\end{array}} \right\} / Na \quad (1)$$

By applying this error ratio a, optimization in which the color near the edge is made different from the color of the temporarily-compressed image can also be applied in a graph in which the ratio of interior colors bounded by a curve is not 1:1.

The error ratio is not limited to what was given above, and can be any value that allows the difference between the reference image and the comparison image to be evaluated. Also, the initial value of the benchmark error ratio is set to a predetermined value, and is varied so that the raster image can be compressed to fit the designated memory capacity.

Also, the benchmark error ratio may be corrected for each image according to the characteristics, type, display mode, and so forth of the vector image to be processed.

Examples of the characteristics of a vector image include the size of the image, the number of expressed colors of the image, the brightness range of the image, and the number of edges of the image. For instance, when a vector image of large size is compressed, it will be easier to recognize a discrepancy between the compressed raster image and the original vector image than when a vector image of small size is compressed. In view of this, weighted correction may be performed so that the larger is the size of the vector image being processed, the lower is the benchmark error ratio. Also, when a vector image with a large number of expressed colors is compressed, for example, it will be easier to recognize a discrepancy between the compressed raster image and the original vector image than when a vector image with fewer expressed colors is compressed. In view of this, weighted correction may be performed so that the more expressed colors there are in the vector image being processed, the lower is the benchmark error ratio. Also, when a vector image with a wide brightness range is compressed, for example, it will be easier to recognize a discrepancy between the compressed raster image and the original vector image than when a vector image with a narrow brightness range is compressed. In view of this, weighted correction may be performed so that the wider the brightness range is in the vector image being processed, the lower is the benchmark error ratio. Also, when a vector image with a large number of edges is compressed, for example, it will be easier to recognize a discrepancy between the compressed raster image and the original vector image than when a vector image with few edges is compressed. In view of this, weighted correction may be performed so that the more edges there are in the vector image being processed, the lower is the benchmark error ratio. Also, when text is included in the image, for example, it will be easier to recognize a discrepancy between the compressed raster image and the original vector image than when no text is included. In view of this, weighted correction may be performed so that the benchmark error ratio will be lower when text is included in the vector image being processed than when no text is included.

Examples of the type of vector image include types determined by an application that makes use of background images, character images, and other such images. For example, usually a background image is larger in size and continues to be displayed for a longer time, whereas a character image is smaller in size and changes in a shorter time, so a discrepancy between the compressed raster image and the original vector image will be easier to recognize when a background image is compressed than when a character image is compressed. In view of this, weighted correction may be performed so that a vector image that is a background image has a lower benchmark error ratio than a vector image that is a character image.

Examples of display modes of a vector image include modes of display of an image in the application that makes use of the image, such as an image displayed in a static state, an image displayed in a moving state, an image displayed spanning a plurality of scenes, and an image displayed without spanning a plurality of scenes. For instance, when an image displayed in a static state is compressed, it will be easier to recognize a discrepancy between the compressed raster image and the original vector image than when an image displayed in a moving state is compressed. In view of this, weighted correction may be performed so that an image displayed in a static state will have a lower benchmark error ratio than an image displayed in a moving state. Also, when an image displayed spanning a plurality of scenes is compressed, for example, it will be easier to recognize a discrepancy between the compressed raster image and the original vector image than when an image displayed without spanning a plurality of scenes is compressed. In view of this, weighted correction may be performed so that an image displayed spanning a plurality of scenes will have a lower benchmark error ratio than an image displayed not spanning a plurality of scenes.

Also, if the error ratio of a given image is greater than the benchmark error ratio, the compression ratio is reduced to less than the current value and the processing is returned to step S12, but if the error ratio for one image is greater than the benchmark error ratio, the compression ratio may be changed for all of the images being processed, and the processing repeated from step S12. Also, the compression ratio may be changed and processing performed only on images whose error ratio is greater than the benchmark error ratio, and the processing repeated from step S12.

Binary search is an example of a favorable method for changing the compression ratio. Specifically, in searching for the proper compression ratio, the fact that the error ratio of a compressed image produced by the current compression ratio exceeds the benchmark error ratio means that there has been too much compression, so the compression ratio is changed to be lower than the current compression ratio.

For example, if we let the initial value of the compression ratio be 2, that is, if we let the size of the original image be 1, then when the compression ratio is set to bring the size of the image after compression to 0.5, and the error ratio in this compression ratio exceeds the benchmark error ratio, the compression ratio is changed to 1.33 (=1/0.75), at which the size of the compressed image is added to the current image size (0.5) and the size is increased by one-half this amount (=0.25). Furthermore, when the compression ratio is 1.33 and the error ratio exceeds the benchmark error ratio, the compression ratio is changed to 1.14 (=1/0.875), at which the size of the compressed image is added to the current image size (0.75) and the size is increased by one-half the change of the previous time (0.25) (=0.125). The compression ratio is thus changed, and processing is repeated until the compressed raster image is at the optimal compression ratio at which it is at or under the permitted error ratio with respect to the original vector image.

In step S18, processing is performed to compare the image volume of the temporarily-compressed image with the predetermined designated memory capacity. The processing in this step causes the image compression device 100 to function as a volume evaluation means (e.g., evaluator). If the image volume of the temporarily-compressed image is greater than the designated memory capacity, the processor 10 changes the benchmark error ratio in step S22 and returns the processing to step S12, and repeats the processing from step S12 on. In changing the benchmark error ratio, it is preferable to return the compression ratio to its initial value. If the image volume of the temporarily-compressed image is at or under the designated memory capacity, the temporarily-compressed image obtained by step S16 is stored in the memory 12 as a compressed image of the vector image, and processing is concluded.

When the volume of a compressed image that satisfies the current benchmark error ratio exceeds the designated memory capacity, this means that the benchmark error ratio is too low, so the benchmark error ratio is changed to be greater than the current benchmark error ratio. For example, a specific value is added to the current benchmark error ratio and used as a new benchmark error ratio. When the initial value of the benchmark error ratio is set to 10%, and the volume of the compressed raster image has exceeded the designated memory capacity, 10% is added to the current benchmark error ratio, changing it to 20%. Furthermore, when the volume of the compressed raster image exceeds the designated memory capacity even though the benchmark error ratio has been changed to 20%, another 10% is added to the current benchmark error ratio, changing it to 30%. The benchmark error ratio is thus changed so that the compressed raster image will be as close to the original vector image as possible, while a compressed image is generated in a volume that can be stored in the permitted memory capacity.

In order to find the optimal compression ratio, processing may be performed such that the compression ratio is made lower than the current compression ratio when the image volume of the temporarily-compressed image is at or under the designated memory capacity, the processing from step S12 on is repeated, and a compressed image that is as large as possible and can still fit in the permitted designated memory capacity is obtained.

Here again, binary search can be favorably applied as the method for changing the compression ratio. For instance, when the initial value of the compression ratio is set to 2, that is, a compression ratio at which the size of the compressed image will be 0.5 if we let the size of the original image be 1, the error ratio at this compression ratio is at or under the benchmark error ratio, and the volume of the compressed image is at or under the designated memory capacity, then the compression ratio is changed to 1.33 (=1/0.75), at which the size of the compressed image is added to the current image size (0.5) and the size is increased by one-half this amount (=0.25). Furthermore, when the compression ratio is 1.33, the error ratio is at or under the benchmark error ratio, and the volume of the compressed image is at or under the designated memory capacity, the compression ratio is changed to 1.14 (=1/0.875), at which the size of the compressed image is added to the current image size (0.75) and the size is increased by one-half the change of the previous time (0.25) (=0.125). The compression ratio is thus changed and processing is repeated, and when the memory capacity of the compressed raster image has exceeded the designated memory capacity, the immediately previous compression ratio is used as the optimal compression ratio, the temporarily-compressed image obtained by step S16 using said compression ratio is stored in the memory 12 as the compressed image of the vector image, and the processing is concluded.

REFERENCE SYMBOLS

10 Processor
12 Memory
14 Input module
16 Output module
18 Communication module
100 Image compression device

The invention claimed is:

1. An image compression device, comprising:
a processor and a memory, wherein the processor is configured to, generate a reference image by converting a vector image into a raster image;
generate a temporarily-compressed image by compressing the raster image according to a compression ratio;
generate a comparison image of the same size as the reference image by subjecting the temporarily-compressed image to enlargement processing;
repeat the processing of the temporarily-compressed image and the comparison image while varying the compression ratio if the error ratio between the reference image and the comparison image is greater than a benchmark error ratio; and
repeat the processing of the temporarily-compressed image, the comparison image, and the repeating of the processing of the temporarily-compressed image and the comparison image while varying the compression ratio if the error ratio between the reference image and the comparison image is greater than a benchmark error ratio, while varying the benchmark error ratio if the image volume of the temporarily-compressed image is greater than a predetermined memory capacity when the error ratio in the error evaluator is at or under the benchmark error ratio, and storing the temporarily-compressed image in the memory as a compressed image of the vector image if the image volume of the temporarily-compressed image is at or under the memory capacity.

2. The image compression device according to claim 1, wherein processing is performed on a plurality of vector images, and
the processing of the temporarily-compressed image, the comparison image, and the repeating of the processing of the temporarily-compressed image and the comparison image while varying the compression ratio if the error ratio between the reference image and the comparison image is greater than a benchmark error ratio, is repeated, while varying the benchmark error ratio if the image volume of the temporarily-compressed images for the plurality of vector images is greater than the memory capacity, and stores the temporarily-compressed images for the plurality of vector images in memory as compressed images if the image volume of the temporarily-compressed images is at or under the memory capacity.

3. The image compression device according to claim 2, wherein
the benchmark error ratio is varied according to one or more of the characteristics, type, and display mode of the vector image.

4. A method for compressing vector images, comprising:
a first step of generating a reference image by converting a vector image into a raster image;
a second step of generating a temporarily-compressed image by compressing the raster image according to a compression ratio;
a third step of generating a comparison image of the same size as the reference image by subjecting the temporarily-compressed image to interpolation enlargement processing;
a fourth step of repeating the second and third steps while varying the compression ratio if the error ratio between the reference image and the comparison image is greater than a benchmark error ratio; and
a fifth step of repeating the second to fourth steps while varying the benchmark error ratio if the image volume of the temporarily-compressed image is greater than a predetermined memory capacity when the error ratio in the fourth step is at or under the benchmark error ratio, and storing the temporarily-compressed image in memory as a compressed image of the vector image if the image volume of the temporarily-compressed image is at or under the memory capacity.

5. A non-transitory computer readable medium having machine-executable instructions for image compression, which causes a computer to execute:
generating a reference image by converting a vector image into a raster image;
generating a temporarily-compressed image by compressing the raster image according to a compression ratio;
generating a comparison image of the same size as the reference image by subjecting the temporarily-compressed image to interpolation enlargement processing;
repeating the processing of the generating the temporarily-compressed image and the generating the comparison image while varying the compression ratio if the error ratio between the reference image and the comparison image is greater than a benchmark error ratio; and
repeating the processing of the generating the temporarily-compressed, the generating the comparison image, and the repeating the processing of the generating the temporarily-compressed image and the generating the comparison image, while varying the benchmark error ratio if the image volume of the temporarily-compressed image is greater than a predetermined memory capacity when the error ratio in the repeating the processing of the generating the temporarily-compressed, the generating the comparison image, and the repeating the processing of the generating the temporarily-compressed image and the generating the comparison image is at or under the benchmark error ratio, and storing the temporarily-compressed image in memory as a compressed image of the vector image if the image volume of the temporarily-compressed image is at or under the memory capacity.

* * * * *